Figures 1, 2, 3, 4:
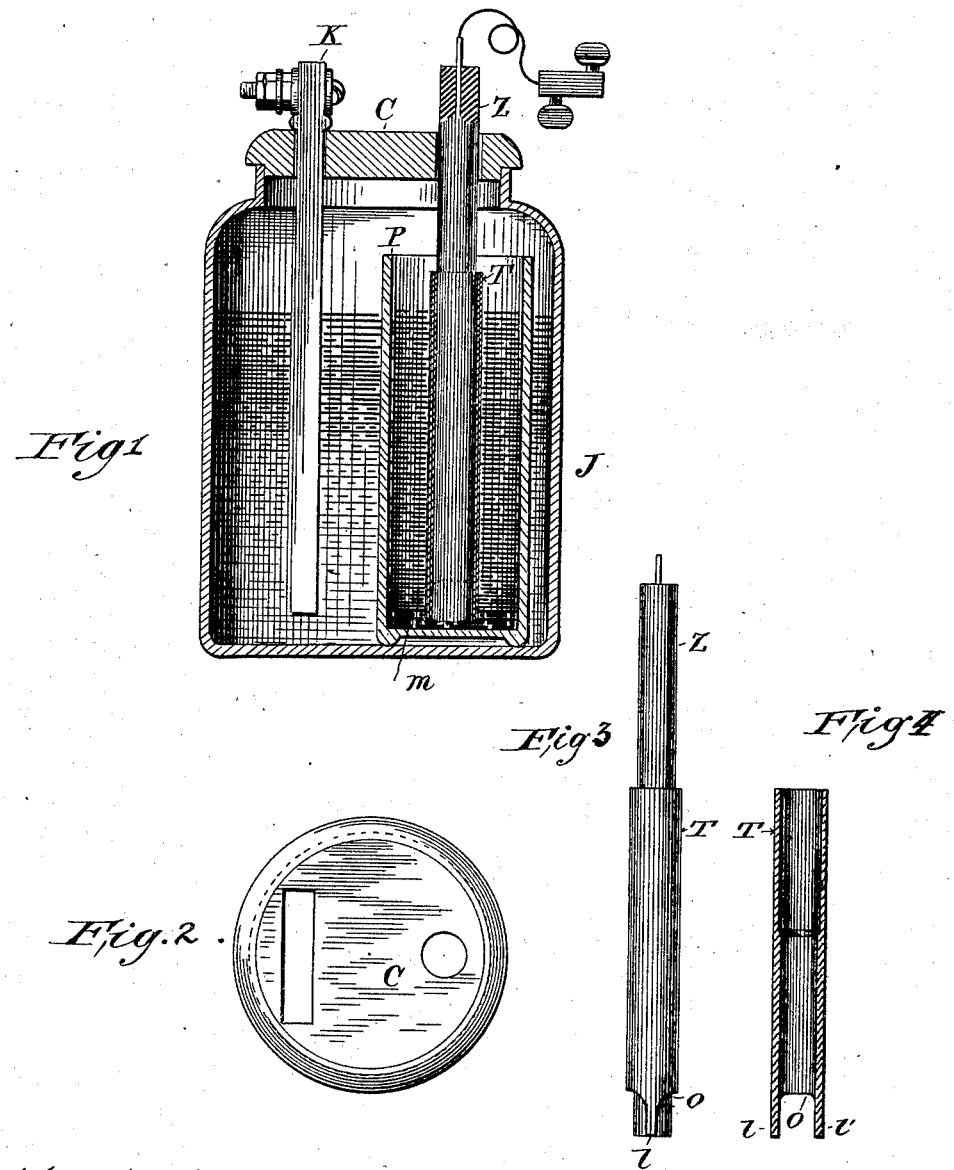

(No Model.)

E. H. LYON.
GALVANIC BATTERY.

No. 502,405. Patented Aug. 1, 1893.

Attest:
G. W. Benjamin
E. C. Grigg.

Inventor:
Edward H. Lyon
By Read & Price
his attys.

UNITED STATES PATENT OFFICE.

EDWARD H. LYON, OF BROOKLYN, NEW YORK.

GALVANIC BATTERY.

SPECIFICATION forming part of Letters Patent No. 502,405, dated August 1, 1893.

Application filed September 26, 1892. Serial No. 446,878. (No model.)

*To all whom it may concern:*

Be it known that I, EDWARD H. LYON, a citizen of the United States, residing at Brooklyn, in the county of Kings and State of New York, have invented certain new and useful Improvements in Galvanic Batteries; and I do hereby declare the following to be a full, clear, and exact description of the invention, such as will enable others skilled in the art to which it appertains to make and use the same.

The object of this invention is to produce a galvanic battery which will maintain a constancy of electro-motive-force for a long period of intermittent use.

Another object is the economical consumption of zinc, the zinc electrode being made to feed automatically to the solution as the zinc is consumed by the action of the battery. In most batteries, after a considerable period of service the electro-motive-force drops very considerably, and in open circuit batteries especially during any one occasion of use for a short interval of time, during which the circuit is continuously closed, the electro-motive-force drops so as to render them unreliable for certain uses. This is especially the case in telephone batteries. I find that these difficulties may be eliminated by exposing in any suitable battery, as, for example, one provided with a chromic salt as a depolarizer, to the action of the solution chemically pure zinc, and confining the action of the solution to a part of the zinc where the whole body of the solution acting upon it is substantially uniform in electrolytic activity. The first feature is maintained by having a zinc electrode surrounded by or immersed in a body of mercury, the major portion of the zinc being screened from the action of the solution so that the metal dissolved by the action of the battery must be such as is afforded by the amalgam, which is of course of a high degree of purity. The second feature is maintained by so arranging a sheath or tube which screens the zinc electrode from the action of the exciting solution that only the amalgam surface or a limited portion of the zinc surface is exposed. The body of zinc is so arranged that it will automatically feed into the mercury so that as the zinc in the amalgam is consumed by the battery more zinc is supplied to the mercury, thus maintaining the constancy of amalgamation, which contributes to the regularity in output of the battery.

The several features of novelty of the invention will be hereinafter more fully described in the specification and definitely indicated in the appended claims.

In the accompanying drawings which illustrate the invention, Figure 1 is a sectional view of a two fluid battery cell embodying my improvements. Fig. 2 is a plan of the same. Figs. 3 and 4 are an elevation and section of a protective sheath to prevent undue consumption of zinc.

The cell illustrated in Fig. 1 comprises a glass jar J provided with a cover C of hard wood bored and slotted to receive the carbon K and zinc Z and saturated with asphaltum varnish. Surrounding the carbon electrode is a suitable depolarizing solution, an acid solution of bichromate of soda being preferred. In the porous cup P is placed the zinc electrode and over the latter is a tube or sheath T, which may be formed of hard rubber, glass, or any suitable material impervious to the solution. Some inactive and non-conducting material such as hard rubber or glass is to be preferred. The inside diameter of the lower portion of the tube is just large enough to permit the zinc rod to move freely therein, and the upper portion is somewhat larger in diameter when the form shown in Fig. 3 is used so as to avoid lifting of the fluid unnecessarily by capillary action.

In the bottom of the porous cup is placed a small quantity of mercury sufficient to at least cover the bottom of the cup, and the porous cup is filled with a saturated solution of common salt. Such an organization yields an electro-motive-force of about 2.07 volts when the cell is first set up and remains of great constancy for a long period of service. For example, after about three months' average work on a carbon transmitter the battery still yields an electro-motive-force of 1.97 volts, whereas a similar battery with zinc unprotected used for the same period of service drops to 1.5 volts. The internal resistance of my cell may be lowered as desired by increasing the active electrode surface.

When set up for use with carbon transmitters the internal resistance at the start is about one ohm, increasing to about two ohms after three months' service. For long distance transmitters the amount of electrode exposure is such as to yield an internal resistance of from 0.8 to 1.5 ohms during a three months' run. It will be noted from the structure just described that the zinc electrode Z is protected by the tube T from the action of the solution so that no local action can occur and practically no zinc is consumed while the battery is on open circuit. The zinc which is consumed in the development of current is supplied by the mercury and is therefore chemically pure and is not attacked by the solutions on open circuit. As the zinc is consumed the mercury takes a fresh supply from the electrode. During a long period of service the electrode gradually sinks as zinc is consumed by the action of the battery. The consumption is so uniform and regular that all of the zinc is utilizable for conversion into current. The internal diameter of the protective tube or sheath should be such that the zinc can slide freely through it so as to be free to gravitate toward the bottom of the porous cup as the mercury demands a fresh supply. The tube may be provided with openings if desired, preferably by cutting away the walls of the tube laterally as indicated in Fig. 3. This cutting away should be within a narrow vertical range so that it will be acted upon uniformly by the solution. I find that in long electrodes there is actually a local voltaic couple between different portions of the zinc electrode, probably by reason of a difference of electrolytic activity of the solution at different depths. Another advantage in cutting away the tube at the bottom when such an expedient is resorted to is that the zinc is highly amalgamated at that point by reason of its proximity to the mercury and therefore a chemically pure grade of zinc is in contact with the solution. When the tube is cut away as just described the liquid will rise more or less between the inner wall of the protective tube and the zinc. This however does not interfere with the action of the battery as the non-conducting sheath or tube prevents electrolytic action. When the tube is cut away it is better to make the upper part of increased internal diameter so as to discourage capillary action at or near the top. In the form illustrated in Fig. 1 the tube T sinking in the mercury acts as a dam against the solution and absolutely prevents access of the latter to the zinc, so that no zinc can reach the solution except such as filters through the mercury. In some cases, however, the form illustrated in Fig. 3 is desirable, where the increased area of electrode exposure is needed and a larger porous cup is not accessible. Instead of simply permitting the zinc to rest on the bottom of the containing vessel it might be forced down by spring pressure which would permit a closer fit of the protective sheath. This would obviously be an equivalent for the gravitative feed.

While I have described my protective sheath in connection with a specific type of battery I desire to have it understood that it may be used with advantage in any cell, its function being to prevent local action and consequent waste of the zinc and to insure a supply of pure zinc for consumption in the battery. A simple well amalgamated zinc or other suitable electrode might be used in connection with the sheath described; in this case the form of tube illustrated in Fig. 4, or some equivalent therefor, would be necessary.

A battery constructed as described may be used with advantage for operating small motors and in other forms of so-called closed circuit work where the use is intermittent and the battery has periods of rest between its terms of service.

Having thus described my invention, what I claim as new, and desire to secure by Letters Patent, is—

1. A positive element for a galvanic battery having a limited area exposed to electrolytic action and protected at all other points by a loosely fitting impervious sheath.

2. An impervious protective tube for a battery zinc adapted to permit the latter to slide within it and provided with lateral openings at or near the bottom.

3. A galvanic battery having its positive electrode surrounded by a protective cover or sheath, a portion of its surface only being exposed within narrow vertical limits.

4. A galvanic battery provided with a positive electrode inclosed loosely in a protective sheath and adapted to feed to the solution by gravitation through said sheath.

5. A galvanic battery provided with a vertical zinc electrode dipping in mercury and inclosed in a protective sheath or tube.

6. An impervious protective sheath or tube adapted to loosely surround a positive battery electrode provided with openings in substantially the same horizontal plane to expose a portion of the electrode to electrolytic action within an area of substantially uniform electrolytic activity.

7. An impervious protective tube for a battery zinc adapted to permit the latter to slide within it and provided with an opening or openings at the bottom to permit electrolytic action.

8. A galvanic battery having a negative electrode surrounded by a suitable depolarizing agent, and a zinc electrode resting on the bottom of the porous cup, a protective sheath or cover loosely surrounding the zinc, and a body of mercury surrounding the bottom of the zinc.

9. A protective tube or sheath for a battery zinc having an internal diameter adapted to permit the zinc to slide through it and having an opening or openings near its bottom, the upper portion of the tube being of larger internal diameter than the lower portion, for the purpose described.

In testimony whereof I affix my signature in presence of two witnesses.

EDWARD H. LYON.

Witnesses:
ROBT. H. READ,
E. C. GRIGG.